United States Patent [19]

DelPico

[11] 4,160,726
[45] Jul. 10, 1979

[54] ULTRAFILTRATION PROCESS FOR THE CONCENTRATION OF POLYMERIC LATICES

[75] Inventor: Joseph DelPico, Brockton, Mass.

[73] Assignee: Abcor, Inc., Wilmington, Mass.

[21] Appl. No.: 684,467

[22] Filed: May 7, 1976

[51] Int. Cl.² ............................................. B01D 13/00
[52] U.S. Cl. ............................... 210/23 F; 210/433 M
[58] Field of Search .................. 210/22, 23 H, 23 F, 210/321 R, 433 M

[56] References Cited

U.S. PATENT DOCUMENTS

| 3,331,772 | 7/1967 | Brownscombe et al. | 210/23 H |
| 3,373,056 | 3/1968 | Martin | 210/23 H X |
| 3,847,804 | 11/1974 | DelPico | 210/23 F |
| 3,956,114 | 5/1976 | DelPico et al. | 210/23 F |

FOREIGN PATENT DOCUMENTS

| 2458066 | 6/1975 | Fed. Rep. of Germany | 210/23 F |
| 2420922 | 11/1975 | Fed. Rep. of Germany | 210/23 F |
| 1398111 | 6/1975 | United Kingdom | 210/23 H |
| 1398112 | 6/1975 | United Kingdom | 210/23 H |

Primary Examiner—Robert H. Spitzer
Attorney, Agent, or Firm—Richard P. Crowley

[57] ABSTRACT

In a process for the concentration of an aqueous polymeric latex, which latex comprises polymeric particles dispersed in an aqueous phase by a semipermeable membrane process, such as an ultrafiltration process and which latex is subject to destabilization, the improvement which comprises: adding to the latex a sufficient amount of a compatible surfactant to stabilize the latex and to maintain the dispersion of the polymeric particles in the aqueous phase of the latex during the concentration of the latex in a semipermeable membrane process.

17 Claims, 1 Drawing Figure

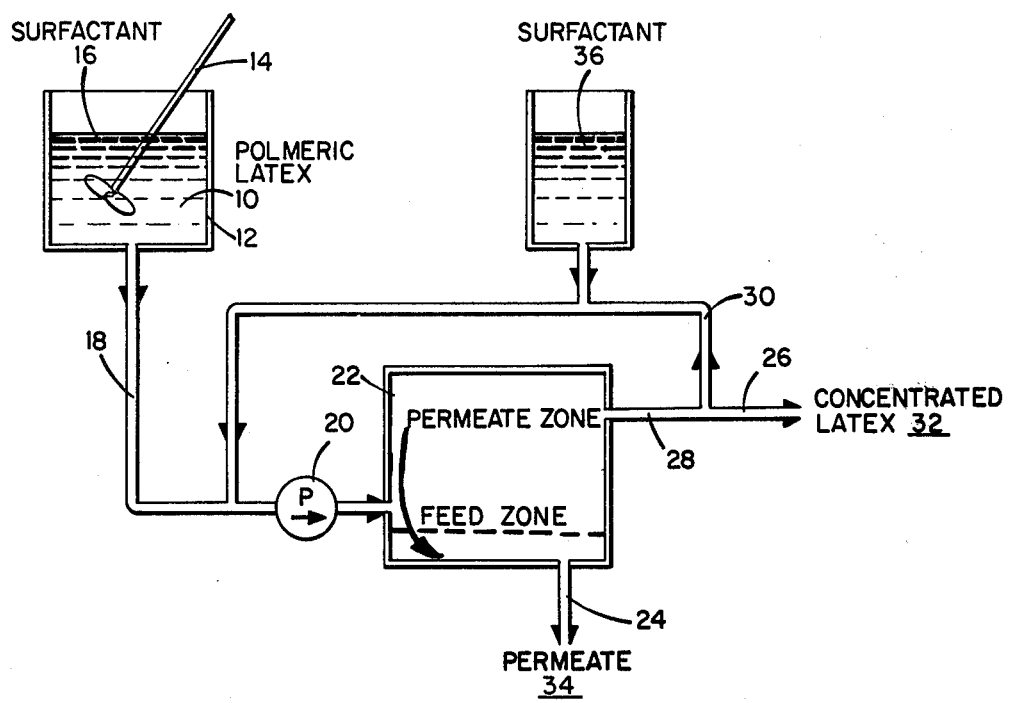

ULTRAFILTRATION PROCESS FOR THE CONCENTRATION OF POLYMERIC LATICES

BACKGROUND OF THE INVENTION

Semipermeable membrane devices, and in particular semipermeable ultrafiltration membrane devices, have been employed to concentrate or separate polymeric emulsions or latices. Such latices typically comprise solid polymeric particles dispersed in water or a water-alcohol or other liquid phase. Often such latices contain a surfactant material which has been added during the manufacturing process to disperse the polymeric particles in the liquid phase. Typical latices would include, but not be limited to: styrene-butadiene latices, polyvinyl-chloride latices and the like.

Past commercial attempts to concentrate such latices through the removal of a portion of the liquid phase after manufacture from a permeate zone of a semipermeable membrane device have not been successful. Such lack of success has been due in part to the inability of the semipermeable membranes to maintain the initially or originally high flux rates during the separation or concentration process. Quite often the flux rates rapidly diminish with time to an unsatisfactory or very low flux value, and, therefore, require, such as described in my prior application (now U.S. Pat. No. 3,956,114, issued May 11, 1976), the periodic employment of a solvent in order to help maintain or restore such original flux value. Thus, it is desirable to provide a rapid, simple, and inexpensive process which will permit the concentration of polymeric latices in a semipermeable membrane process, such as a low-pressure, ultrafiltration process, and for such process to operate in a commercially satisfactory and continuous manner without severe flux degradation.

SUMMARY OF THE INVENTION

My invention relates to an improved process for the concentration or separation of polymeric latices, and in particular, my invention concerns an improved process for stabilizing a polymeric latex during a concentration process by ultrafiltration through the addition of surfactant to the latex to stabilize the latex and thereby maintain acceptable flux rates during the concentration process.

I have found that, by adding surfactants, particularly anionic and nonionic surfactants, to polymer latices prior to or during the concentration or separation process of the latices with a semipermeable membrane, the latices are stabilized and good flux rates are maintained. I believe that the addition of the surfactants to the polymer latices provides for adsorption on the surface of the latex particles or electrical boundary layers, which prevent or retard the polymer particles from coalescing during the semipermeable membrane process.

The concentration and/or separation of a polymer latex is carried out by introducing the latex into the feed zone of a semipermeable membrane device, wherein a feed zone is separated from a permeate zone through the employment of a particular semipermeable membrane. The semipermeable membrane device may comprise one or more reinforced tubes, such as a braided tube having a semipermeable membrane particularly of cellulose acetate or other membrane material, on the inside or the outside of the tube, or may comprise a spiral-type module device, such as described for example in U.S. Pat. Nos. 3,367,504; 3,386,583; 3,397,790; and 3,417,870.

Typically, polymer latices are separated or concentrated in an ultrafiltration, rather than a reverse osmosis, process, wherein the pressures employed are about 10 to 200 psi; for example, 20 to 100 psi. The temperatures employed in such processes may vary, depending upon the viscosity of the latex to be concentrated, the flux rate of the membrane and other factors, but typically range from about 70° to 180° F.; for example, 90° to 140° F. In the process, the latex is introduced into one end of the feed zone of the semipermeable membrane device, and a concentrated latex is removed from the other end of the feed zone and a portion of the liquid phase, typically water and low-molecular weight salts, are removed from the permeate zone. The concentration process may be directed to sending the latex through one or more semipermeable membrane devices in a series, or more typically, the latex is introduced by a pump into the feed zone of the semipermeable membrane, and then the concentrated fraction recycled, employing the same pump or another pump, back to the introductory feed zone portion of the device, while the permeate fraction comprising the liquid phase, typically water with low-molecular-weight materials, and often containing some of the surfactant in the latex is removed from the permeate zone.

I have found that in the process of concentrating a latex mechanical shear is placed on the latex, since the latex is pumped about in a typical ultrafiltration system and that this mechanical shear force contributes to the destabilization of the latex and the formation of coagulum which reduces flux rate. Further, the ultrafiltration semipermeable membrane process removes the liquid-water phase and some surfactant in the polymer latex which contributes further to destabilization of the latex. When the latex destabilizes, then coagulum; that is, aggregates of latex polymeric particles, coagulate and destabilization of the latex occurs, resulting in fouling of the membrane surface and pores with reduced flux rates resulting.

Thus, many polymeric latices are unstable in the presence of the high-mechanical shear required to pump the latex into the feed zone, and to recycle the processed latex back into the feed zone of the semipermeable membrane device. The mechanical shear that is developed in the seals and impellers of the high-volume centrifugal pumps; that is, pumps that have relatively low shear and high volume, are employed in pumping latices through ultrafiltration and reverse-osmosis systems. Such pumps are an opened-face impeller, while pumps which have a closed-face impeller or gear pumps or pumps that have close tolerances are not employed in pumping latices, since such pumps tend to destabilize rapidly the latices. Furthermore, diaphragm pumps, although they produce a pulsating flow, are not normally used, except with an accumulator which evens out the flow rate.

Another pump recommended for use with an ultrafiltration process for the separation of a latex is a low-shear screw pump. Thus, for example, low-shear screw pumps and centrifugal pumps with an opened-face impeller are used in ultrafiltration processes for the concentration of polymeric latices, while other pumps, which place a much higher mechanical shear on the latex, are not recommended, since otherwise very large uneconomical amounts of surfactant may be required to stabilize the latex.

However, regardless of what pumps are used, quite often the latex becomes unstable, even though the latex may contain surfactants added usually during the manufacturing or polymerization process of the latex. Addition of these surfactants added during manufacturing often provides for only a low order of stability. The use of additional surfactants, as required in my process, often is not necessary under normal conditions, because the latex is not subject to a high shear or other factors such as concentration polarization layers employed or found in an ultrafiltration process.

In addition, I have found that latices which are to be concentrated in a semipermeable separation process are often unstable at the concentrations found in the concentration polarization layer formed adjacent the semipermeable membranes employed in the ultrafiltration and reverse-osmosis devices. Since there is a higher concentration of polymer particles in the concentration polarization layer adjacent the membrane skin, this concentration is often sufficient during the process to effect also the destabilization of the latex. Thus, the higher temperatures, the higher concentration of the polarization layer and the greater shear caused by the pumps and the pumping processes during the ultrafiltration process cause a more frequent and energetic collision of the macro-molecules of the polymer particles, and thus lead to a greater tendency of coagulation of the particles and destabilization of the latex, which coagulation results in fouling of the membrane and reduction in flux rate.

I have found that destabilization of the latex during a membrane separation process may be avoided, prevented or at least considerably reduced along with the resulting coagulum from the destabilized latex, by employing additional and minor amounts of a surfactant to the latices prior to or during the concentration process. The amount of the surfactant to be added may vary, depending upon the particular polymeric latices to be employed and the conditions under which the process is to be operated, but typically may comprise about 0.05 to 2.0% of the surfactant based on the weight of the polymer in the latices; for example, from about 0.1 to about 1.0% such as 0.4 to 0.8%. The surfactant may be added in a continuous manner into the latex prior to pumping or during recycle, or where a batch process is used, the surfactant may be added to and mixed with the batch of the latex to be concentrated prior to separation and concentration. Where a portion of the surfactant is removed with the liquid phase from the permeate zone, it may be found necessary to add additional surfactant during the recycling of the concentrated fraction back to the feed zone, to maintain the desired concentration level of the latex to prevent destabilization.

The amount of surfactant required to stabilize the latex during any particular process may be determined by carrying out the particular process under similar temperature and pressure conditions with the desired pump, either in a pilot plant or in a commercial unit and continually adding smaller incremental amounts of surfactant to reach and determine the minimum concentration level required for stabilization of the latex under the commercial operating conditions to be employed. Another method for determining the amount of surfactant to be employed is to test the latex by mixing the latex in a blender while adding incremental amounts of surfactant, and observing for coagulum under the high shear blending conditions. Such a test is a typical test for mechanical stability of latices, as set forth in ASTM D 1076-73 (Test No. 16).

My process will be described in reference to particular polymeric latices; however, my process is useful with a wide variety of polymeric latices, such as natural latex, butyl rubber, nitrile rubber, ethylene-propylene copolymers and terpolymers, homo and copolymers of diene polymers like butadiene-styrene copolymers, as well as terpolymers with acrylonitrile, acrylate latex, polyvinyl-alcohol and polyvinyl-acetate emulsions, homo and copolymers of vinyl-halides like polyvinyl-chloride and vinyl chloride-vinyl acetate copolymers and other polymeric emulsions and latex compositions where it is desired to concentrate the latex to a higher concentration value. My process is particularly applicable to vinyl-chloride polymer latices, such as polyvinyl-chloride latex or a vinyl-chloride-vinyl-acetate latex and the like and natural rubber latex since such latices tend generally to be relatively unstable as compared to styrene-butadiene rubber latices.

The polymeric latices may be concentrated typically up to as high as 70% by weight concentration. For example, with polyvinyl-chloride and vinyl-halide/vinyl-acetate copolymer emulsions, the latex is usually manufactured at about 25 to 35% polymer, and is concentrated up to 50 to 60%. Styrene-butadiene rubber latices are often concentrated from about 10 to 20%; for example, 15%, up to 45 to 60% concentration levels, or higher if desired. My process may also be employed on waste streams which contain a polymeric latex where it is desired to concentrate the latex from a very low value; for example, less than 1%, up to 20%, and, thereafter, to mix the concentrated fraction recovered with other latex concentration for further concentration to a higher level. Therefore, in the concentration processes for polymeric latices, the feed stream may range from very low amounts (as low as 0.1 to about 1%) to concentration levels of 55 to 75% or higher. Where very high concentrations occur, the polymer often becomes viscous, so that a higher temperature must be employed in the ultrafiltration process, and when such occurs, often additional amounts of surfactant are required in order to prevent destabilization of the latices due to the more energetic polymer molecules at the higher temperature process levels.

The surfactants useful in my process and to be added to the polymeric latices encompass a wide variety of surfactants and surfactant-functioning materials. Any material may be used as a surfactant in my process as I use the term which stabilizes the polymeric latices under the membrane concentration layer conditions and high-shear pumping conditions of the process. Typically the surfactant should be compatible with the polymer latices; that is, not lead to an electrical imbalance, for example, adding an anionic surfactant to a cationic stabilized latex, and preferably the surfactant employed is the same surfactant or same type or class as used by the manufacturer in the latex, and more particularly, the use of nonionic surfactants is preferred. It is recognized that some latices are sold as unstable-type latices and are compounded in this manner so that they may be used for a particular process. However, such latices are not of the type useful in ultrafiltration processes and are not generally used in such processes, due to such compounded and intentional destabilization of the latices.

The polymeric latices are usually prepared by polymerization of the monomer in an aqueous medium in the presence of a suitable polymerization catalyst to provide a latex of 10 to 60% total solids. The aqueous medium may be surfactant-free or it may contain a surfactant or a surfactant may be added later in the process.

Suitable surfactants used in latex manufacture and useful in my process include organic sulfates and sulfonates, such as sodium lauryl sulfate, but are not limited to: ammonium lauryl sulfate, the alkali-metal and ammonium salts of sulfonated petroleum or paraffin oils, the sodium salts of aromatic sulfonic acids, such as the sodium salt of naphthalene sulfonic acids, the sodium salts of dodecane-1-sulfonic acid, octadiene-1-sulfonic acid, etc.; aralkyl sulfonates, such as sodium isopropyl benzene sulfonate, sodium dodecyl benzene sulfonate and sodium isobutyl naphthalene sulfonate; alkali-metal and ammonium salts of sulfonated discarboxylic acid esters and amides, such as sodium dioctyl sulfosuccinate, sodium octadecyl sulfo succinamate and the like and others.

Cationic surfactants, such as the salts of strong inorganic acids and organic bases, containing long carbon chains, for example, lauryl amine hydrochloride, the hydrochloride of diethylaminooctyl decylamine, trimethyl cetyl ammonium bromide, dodecyl trimethyl ammonium bromide, the diethyl cyclohexylamine salt of cetyl sulfonic ester and others may be used. One preferred class, however, is the anionic surfactants such as the alkali-metal and ammonium salts of aromatic sulfonic acids, aralkyl sulfonates and long-chain alkyl sulfates. Suitable anionic surfactants would comprise sodium lauryl sulfate, ethoxylated sodium sulfo succinate, and alkylaryl polyether sulfates.

In addition to the above and other polar or ionic emulsifiers, and surfactants, another most preferred class which may be used, singly or in combination with one or more of the foregoing types of surfactants, includes the so-called "nonionic" surfactants, such as the polyether alcohols prepared by condensing ethylene or propylene oxide with higher alcohols, the fatty alkylolamine condensates, the digylcol esters of lauric, oleic and stearic acids and others. Specific nonionic surfactants include $C_8$–$C_9$ alkyl phenoxy polyethoxy ethanols or propanols containing from about 20 to 100 ethoxy or proxy groups like tertiary octyl and nonylphenoxypolyethoxy ethanols.

My invention will be described for the purpose of illustration only in connection with the concentration of certain polymeric lactices; however, it is recognized and within the spirit and scope of my invention that various changes, modifications and alterations may be made without departing from the spirit and scope of my invention.

BRIEF DESCRIPTION OF THE DRAWING

The drawing shows an illustrated schematic process of an ultrafiltration device employed for the concentration of a polymeric latex employing my invention.

DESCRIPTION OF THE EMBODIMENTS

The drawing shows an ultrafiltration device and process in which a polymeric latex 10 is placed in a batch container 12, and a surfactant 16 added and mixed by a mixer 14 with the polymeric latex. The polymeric latex 10 with the additional surfactant is withdrawn from the container 12 through line 18 and through a centrifugal opened-face impeller high-volume pump 20 into an ultrafiltration membrane device 22 comprising for example a module with a plurality of tubes having a semipermeable membrane coated on the inside diameter of the reinforced tubes or a spiral module ultrafiltration membrane device; for example, with a cellulose-acetate semipermeable membrane.

A permeate fraction 34 is removed from line 24 from the permeate zone, the permeate fraction comprising the liquid phase, primarily water, plus also some low-molecular-weight salts if present in the original polymeric latex 10, and also small amounts of surfactants in some cases. The concentrated latex is removed from the other end of the feed zone through line 28 and is recycled through line 30 to be reintroduced into the semipermeable membrane device 22 until the desired level of concentration is obtained, and then the concentrated latex 32 is removed continuously through line 26. Additional surfactant 36 is shown introduced into the recycle line 30 to maintain the surfactant level. The drawing illustrates a typical batch process for the concentration of a manufactured latex. Of course, where desired, rather than employing a single semipermeable membrane unit 22, a series of such units may be employed, with the latex progressively concentrated as it passes through each membrane device.

EXAMPLE 1

A polyvinyl-chloride latex having a solids content of about 34.5% was introduced into an ultrafiltration process as set forth in the drawing, and it was found that the centrifugal pump could only run for approximately two hours at 2600 rpm before the latex coagulated. The addition of an anionic or a nonionic surfactant to the polyvinyl-chloride latex, at approximately 0.4% of the weight of the polymer, permitted the latex to be run in the ultrafiltration process and to be concentrated to approximately 64% solids without difficulty. One surfactant employed was Tergitol 7, an anionic surfactant similar to the surfactant employed by the manufacturer is stabilizing the polyvinyl-chloride latex during manufacture. Tergitol 7 is a trademark of Union Carbide Corp. to identify a sodium sulfonate derivative of 1, 9-diethyltridecanol-6. A nonionic surfactant Triton X-100, an alkylaryl polyether alcohol, which is a trademark of Rohm & Haas Co., was also added and found to be satisfactory.

EXAMPLE 2

A polyvinyl-chloride emulsion of a different manufacturer, when Example 1, having about 30% solids, when placed in an ultrafiltration system of the type described, and could not be pumped at all without destabilization of the latex and formation of coagulum. The addition of between 5 and 50 ml per gallon of an anionic surfactant of the same type as employed by the manufacturer to the latex provided additional stability and permitted the latex to be concentrated in the ultrafiltration process.

EXAMPLE 3

A 50%-solids styrene-butadiene rubber latex of about 50%-solids was diluted to 0.5% solids, and run with both tubular and spiral ultrafiltration membrane devices. After several hours of running at a steady state, a the temperature increased from 15° to 35° C., the process flux dropped from 60 to 10 gfd for the tubes (gallons per square foot of membrane per day). The addition of about 5% of a nonionic surfactant Triton X-100, based on the polymer weight, at a rate of 14 ml to 15 gallons of a latex prevented the process flux of the tubes and the spiral membrane from decreasing with time.

After addition of the surfactant the flux of the membrane was then approximately 200 gfd at 50° C.

Thus, the addition of surfactants to polymer latices prior to or during the process of ultrafiltration stabilized the latices and prevented coagulum from forming and decreasing the flux rate. The addition of surfactant also prevented pump failure, which failure often occurs by virture of the coagulant plugging up the seals in the internal portion of the pump. My process provides a rapid, simple and an effective means to overcome the difficulties of the prior art and to permit the commercial concentration and seperation of polymeric lactices.

What I claim is:

1. In a process for the concentration or separation of an aqueous polymeric latex, which comprises polymer particles dispersed in an aqueous-liquid phase, by a semipermeable membrane which permits the passage of the liquid phase and retains the polymer particles, the improvement which comprises:

adding to the latex a sufficient amount of a compatible surfactant to maintain the dispersion of the polymer particles in the liquid phase during the concentration or separation process, thereby preventing the formation of coagulum into the latex and the degradation of the flux rate of the process.

2. The process of claim 1 which includes adding about 0.05 to 2.0 weight percent of the surfactant based on the weight of the polymer in the latex.

3. The process of claim 1 wherein the process is an ultrafiltration process carried out at a pressure of about 10 to 200 psi.

4. The process of claim 1 wherein the process is an ultrafiltration process carried out at a temperature of from about 70° to 180° F.

5. The process of claim 1 wherein the latex is a vinyl-chloride resin, a styrene-butadiene or a natural rubber latex.

6. The process of claim 1 wherein the latex contains from about 0.1 to 2% by weight polymer, and is concentrated to about 10 to 20%.

7. The process of claim 1 wherein the latex contains from about 20 to 40% by weight polymer, and is concentrated to about 45 to 70%.

8. The process of claim 1 wherein the latex contains a surfactant and the surfactant added is the same surfactant as in the latex.

9. The process of claim 1 wherein the surfactant is an anionic or a nonionic surfactant.

10. The process of claim 1 wherein the surfactant is an anionic surfactant which comprises a water-soluble salt of a long-chain alcohol sulfate.

11. The process of claim 1 wherein the surfactant is a nonionic surfactant which comprises an alkylaryl polyether alcohol.

12. The process of claim 1 wherein the latex is introduced into contact with the semipermeable membrane by an openedface impeller centrifugal pump.

13. The process of claim 1 which includes adding the surfactant to a batch of the latex prior to concentration and separation and pumping the latex into contact with the semipermeable membrane.

14. The process of claim 1 wherein the latex is withdrawn from and recirculated into contact with the semipermeable membrane until the desired concentration level is obtained.

15. The process of claim 1 wherein the semipermeable membrane is disposed in an ultrafiltration apparatus containing tubes to support the membrane or in a spiral module apparatus.

16. The process of claim 1 which includes adding surfactant continuously to the latex.

17. In a process for the concentration or separation of an aqueous polymeric latex, which comprises polymer particles dispersed in an aqueous liquid phase, by an ultrafiltration semipermeable membrane process wherein the membrane permits the passage of the liquid phase and retains the polymer particles, the improvement which comprises:

(a) providing a latex selected from the group of polymers consisting of vinyl-chloride, butadiene-styrene and natural rubber, which latex, under the process conditions of the ultrafiltration process, becomes destabilized;

(b) adding to the latex a sufficient amount of a compatible anionic or nonionic surfactant to maintain the dispersion of the polymer particles in the liquid phase during the concentration or separation process, thereby preventing the formation of coagulum from the latex and the degradation of the flux rate of the process;

(c) pumping the stabilized latex into the inlet of a feed zone of an ultrafiltration membrane device;

(d) withdrawing a permeate fraction from the permeate zone of the ultrafiltration device;

(e) withdrawing a concentrated latex from the feed zone and recycling by pumping at least a portion of the concentrated latex to the inlet of the feed zone; and (f) recovering a concentrated latex from the feed zone.

* * * * *